United States Patent
Okuno

(10) Patent No.: US 8,315,803 B2
(45) Date of Patent: Nov. 20, 2012

(54) VEHICLE NAVIGATION SYSTEM INCLUDING MOVABLE DISPLAY DEVICE

(75) Inventor: Kiyokazu Okuno, Nagoya (JP)

(73) Assignee: DENSO CORPORATION, Kariya (JP)

( * ) Notice: Subject to any disclaimer, the term of this patent is extended or adjusted under 35 U.S.C. 154(b) by 356 days.

(21) Appl. No.: 12/656,120

(22) Filed: Jan. 19, 2010

(65) Prior Publication Data

US 2010/0198497 A1  Aug. 5, 2010

(30) Foreign Application Priority Data

Feb. 2, 2009  (JP) .................................. 2009-21869

(51) Int. Cl.
*G01C 21/36* (2006.01)
(52) U.S. Cl. ........................................ 701/533; 701/428
(58) Field of Classification Search .................. 701/428, 701/431, 432, 440, 454, 409, 410, 419, 533; 340/425.5, 995.26; 381/86
See application file for complete search history.

(56) References Cited

U.S. PATENT DOCUMENTS

| | | | |
|---|---|---|---|
| 7,804,399 | B2 | 9/2010 | Okuno et al. |
| 8,002,179 | B2 * | 8/2011 | Feit et al. ..................... 235/382 |
| 2003/0128103 | A1 | 7/2003 | Fitzpatrick et al. |
| 2009/0128307 | A1 * | 5/2009 | Hentsch et al. ............ 340/425.5 |

FOREIGN PATENT DOCUMENTS

| | | |
|---|---|---|
| JP | A-10-029446 | 2/1998 |
| JP | 2005241559 | * 9/2005 |
| JP | A-2007-212437 | 8/2007 |
| JP | A-2008-046211 | 2/2008 |

OTHER PUBLICATIONS

Office Action dated Oct. 26, 2011 in corresponding CN Application No. 201010110996.3 (and English translation).
Office Action mailed on Mar. 8, 2011 issued in the corresponding Japanese Patent Application No. 2009-021869 (English translation enclosed).

* cited by examiner

*Primary Examiner* — Thomas Black
*Assistant Examiner* — Marthe Marc-Coleman
(74) *Attorney, Agent, or Firm* — Posz Law Group, PLC

(57) ABSTRACT

A vehicle navigation system includes a movable display device having a display panel, a voice output device, a navigation screen determining portion, and a voice guidance control portion. The navigation screen determining portion determines whether a route guidance is being performed by displaying a navigation screen on the display panel when the part of the display panel is housed. When the navigation screen determining portion determines that the route guidance is being performed by displaying the navigation screen on the display panel, the voice guidance control portion controls the voice output device so that the voice output device performs the route guidance with a voice output.

8 Claims, 4 Drawing Sheets

VEHICLE NAVIGATION SYSTEM INCLUDING MOVABLE DISPLAY DEVICE

CROSS REFERENCE TO RELATED APPLICATIONS

The present application is based on and claims priority to Japanese Patent Application No. 2009-21869 filed on Feb. 2, 2009, the contents of which are incorporated in their entirety herein by reference.

BACKGROUND OF THE INVENTION

1. Field of the Invention

The present invention relates to a vehicle navigation system including a movable display device.

2. Description of the Related Art

Conventionally, it is known a movable display device that includes a display panel at least a part of which can be housed. For example, US 2003/0128103 A discloses a vertically movable display device in which a part of a display panel can be housed inside an instrument panel.

In a case where the above-described display device is applied to a vehicle navigation system, when the part of the display panel is housed inside the instrument panel, a screen area of the display panel is reduced. Thus, a map for a route guidance is difficult to be seen and the route guidance may be insufficient.

SUMMARY OF THE INVENTION

In view of the foregoing problems, it is an object of the present invention to provide a vehicle navigation system including a movable display device that can stably provide a route guidance even when a part of a display panel is housed.

A vehicle navigation system according to an aspect of the present invention includes a display device having a display panel, a voice output device, a navigation screen determining portion, and a voice guidance control portion. The display device is configured to be movable so that a part of the display panel is capable of being housed. The vehicle navigation system is configured to search a route from a starting point to a destination and perform a route guidance of the route by displaying a navigation screen on the display panel. The voice output device is configured to perform the route guidance with a voice output. A navigation screen determining portion is configured to determine whether the route guidance is being performed by displaying the navigation screen on the display panel when the part of the display panel is housed. When the navigation screen determining portion determines that the route guidance is being performed by displaying the navigation screen on the display panel, a voice guidance control portion is configured to control the voice output device so that the voice output device performs the route guidance with the voice output.

The vehicle navigation system can stably provide the route guidance even when the part of a display panel is housed.

BRIEF DESCRIPTION OF THE DRAWINGS

Additional objects and advantages of the present invention will be more readily apparent from the following detailed description of exemplary embodiments when taken together with the accompanying drawings. In the drawings.

DETAILED DESCRIPTION OF THE EXEMPLARY EMBODIMENTS

Figure 1:
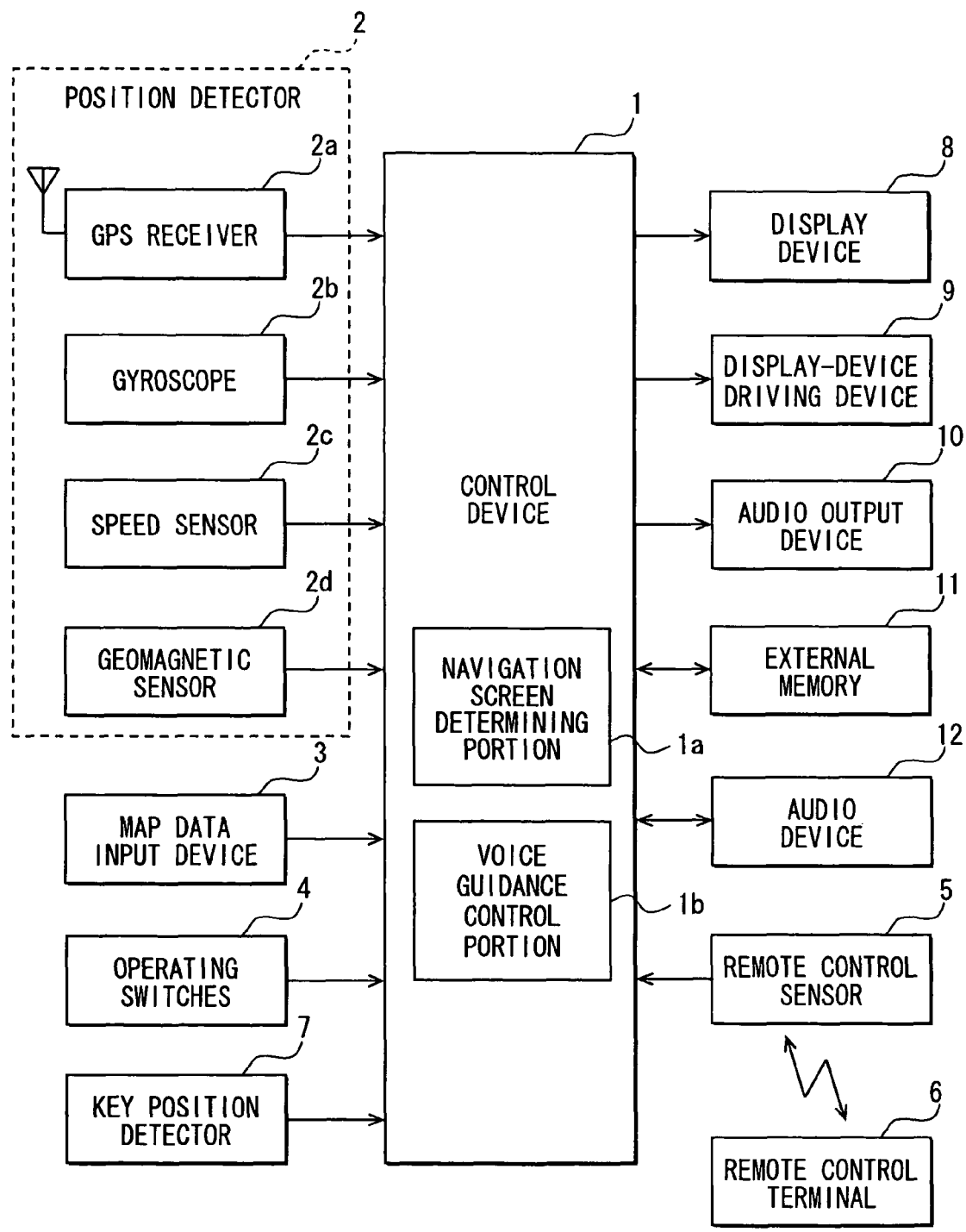
FIG. 1 is a block diagram showing a vehicle navigation system according to an exemplary embodiment of the present invention.

A navigation system 100 according to an exemplary embodiment of the present invention will be described with reference to FIG. 1. The navigation system 100 is configured to be provided in a vehicle. The navigation system 100 includes a position detector 2, a map data input device 3, a group of operating switches 4, a remote control sensor 5, a remote control terminal 6, a key position detector 7, a display device 8, a display-device driving device 9, an audio output device 10, an external memory 11, an audio device 12, and a control device 1 coupled with the above-described components.

The position detector 2 includes sensors such as a GPS receiver 2a, a gyroscope 2b, a speed sensor 2c, and a geomagnetic sensor 2d. The GPS receiver 2a is provided for a global positioning system (GPS) for detecting the present location of the vehicle based on a radio wave from an artificial satellite. The gyroscope 2b detects an angular speed around a veridical direction of the vehicle. The speed sensor 2c detects a speed of the vehicle based on a rotating speed of each wheel. The geomagnetic sensor 2d detects a geomagnetism. The position detector 2 detects the present location and a traveling direction of the vehicle. The GPS receiver 2a, the gyroscope 2b, the speed sensor 2c, and the geomagnetic sensor 2d have margins of error different from one another and complement each other. Depending on accuracy of the sensors, the position detector 2 may also be configured by only a part of the above-described sensors. The position detector 2 may further include a rotating sensor for a steering and a distance sensor for detecting distance between vehicles.

The map data input device 3 is attached with a storage medium. The map data input device 3 reads various data stored in the storage medium. The various data include map matching data, map data, and mark data. The map data includes link data and node data. Each road in a map is divided by a plurality of nodes such as an intersection, a diverging point, and a junction, and each two of the nodes is connected through a link. By connecting the links, the road is formed. The link data includes link IDs for identifying each of the links, lengths of the links, coordinates (latitude and longitude) of start points and end points of the links, road names, road widths, the number of lanes, existence or nonexistence and the number of right-turn lane and left-turn lane, and speed limits.

The node data includes node IDs for identifying each of the nodes, node coordinates, node names, connected link IDs describing the link IDs of the links connected with each of the nodes.

The storage medium also includes data of categories, names and addresses of various facilities. The data is used, for example, for setting a destination when a route is searched. The storage medium includes, a CD-ROM, a DVD-ROM, a memory card, and a hard disk, for example.

The group of operating switches 4 may be touch switches integrated with the display device 8 or mechanical switches, for example. By operating one or more of the operating switches 4, various control signals are input to the control device 1, for example, for changing a map scale, selecting a menu screen, setting a destination, searching a route, starting a route guidance, correcting the present location, changing display screen, setting an voice guidance, adjusting volume, selecting an audio source, selecting a radio station, selecting a track, starting performance, stopping performance, setting a playing order, adjusting sound quality, switching navigation screen and an audio screen, housing the display panel, ejecting the display panel. The group of operating switches 4 includes a switch for setting a starting point and a destination. By operating one of the operating switches 4, a user of the vehicle can set a starting point and a destination from previously registered points, names of facilities, telephone numbers, and addresses.

The remote control terminal 6 includes a plurality of operating switches (not shown). By operating one or more of the operating switches, various control signals similar to those of the group of operating switches 4 can be input to the control device 1.

The key position detector 7 detects a key position of an ignition key. When the ignition key is located at "IG-ON," an engine of the vehicle is activated. When the ignition key is located at "ACC," accessories are activated. When the ignition key is located at "IG-OFF," the engine is deactivated.

The display device 8 can display a navigation screen and an audio screen in full color. In the navigation screen, for example, a map for a route guidance and a destination selecting screen are displayed. In the audio screen, for example, a selected radio station, or a title and a performance time of tracks recorded in a music storage medium are displayed. The music storage medium includes a music CD, an MD, a memory stick, and an SD card, for example. The display device 8 includes a display panel 8a. The display panel 8a may be a liquid crystal display, an organic electroluminescence display, or a plasma display, for example.

The display device 8 is a movable display that can put a part of the display panel 8a in a housing case and can eject the display panel 8a from the housing case.

For example, the display device 8 may be configured to put the part of the display panel 8a in a housing case provided in an instrument panel of the vehicle and eject the display panel 8a from the housing case using a sliding mechanism. The display device 8 may also be configured to put the part of the display panel 8a in a housing case provided in an interior panel other than the instrument panel and eject the display panel from the housing case. The display device 8 may also be configured to put the part of the display panel 8a to an inside of an interior panel including an instrument panel and elect the display panel 8a from the inside of the interior panel.

The display device 8 may also be configured so that the part of the display panel 8a is housed and is ejected by a mechanism other than the sliding mechanism. That is, the display device 8 has a mechanism for hiding at least the part of the display panel 8a from view.

The display-device driving device 9 drives the display device 8 based on a control signal from the control device 1 so that the part of the display panel 8a is housed in the housing case or the display panel 8a is ejected from the housing case. The display-device driving device 9 drives the display device 8, for example, using a motor as a motive power.

The audio output device 10 includes a speaker. The audio output device 10 outputs a voice guidance based on a control signal from the control device 1.

The external memory 11 may be a writable mass-storage device including a hard disk. The external memory 11 may store large quantities of data and data not to be erased after turning off a power source, for example. Frequently used data may be copied from the map data input device 3 to the external memory 11. The external memory 11 may also be a removable memory having a small storage capacity.

The audio device 12 includes a deck for playing music data stored in the music storage medium and a radio tuner for receiving a radio broadcast. The audio device 12 transmits an audio signal to the audio output device 10 through the control device 1, and thereby the audio output device 10 outputs audio.

The control device 1 may be a computer. In the control device 1, a central processing unit (CPU), a memory such as a read-only memory (ROM) and a random-access memory (RAM), an input-output part, and a bus line connecting the CPU, the memory and the input-output part are disposed. The control device 1 includes a navigation screen determining portion 1a, and a voice guidance control portion 1b. The control device 1 executes various processes as a navigation function based on signals from the position detector 2, the map data input device 3, the operating switches 4, the remote control sensor 5, and the external memory 11. The control device 1 executes, for example, a map scale changing process, a menu screen selecting process, a destination setting process, a route search executing process, a route guidance starting process, a present location correcting process, a displayed screen changing process, a voice guidance setting process, and a volume adjusting process. In the route search executing process, when a starting point and a destination are input through the operating switches 4 or the remote control terminal 6, the control device 1 searches a plurality of routes satisfying a predetermined condition such as a distance priority and a time priority using a Dijkstra method. In the route guidance starting process, the control device 1 displays the routes searched in the route search executing process in an electric map on the display device 8 and starts the route guidance. In the voice guidance setting process, the control device 1 sets whether the route guidance voice output is performed based on an operation input transmitted from the operating switches 4 or the remote control terminal 6. When the control device 1 receives an operation input for performing the route guidance with the voice output, the control device 1 controls the audio output device 10 so that the audio output device 10 performs the route guidance with the voice output, that is, a voice guidance. When the control device 1 receives an operation input for not performing the route guidance with the voice output, the control device 1 controls the audio output device 10 so that the audio output device 10 does not perform the route guidance with the voice output. Thus, the audio output device can operate as a voice output device, and the operating switches 4 and the remote control terminal 6 can operate as a first operation input portion.

In addition, the control device 1 executes various processes as an audio function based on signals from the operating switches 4, the remote control sensor 5, and the audio device 12. The control device 1 executes, for example, an audio source selecting process, a radio station selecting process, a track selecting process, a performance starting process, a performance stopping process, a performing order setting process, a volume adjusting process; and a sound quality adjusting process. In the audio source selecting process, when the control device 1 receives an operating signal from the operating switches 4 or the remote control terminal 6 for selecting one of audio sources including an AM radio, an FM radio, a CD, an MD, and memory stick, the control device 1 sets that an audio signal from the selected audio source is output from the audio output device 10.

The audio sources are not limited to above-described examples. The audio sources may also be a part of the above-described examples. An audio source other than the above-described examples may also be included.

Furthermore, the control device 1 executes a process for switching between the navigation screen and the audio screen (navi/audio switching process) based on signals from the operating switches 4 and the remote control sensor 5. In the navi/audio switching process, when the control device 1 receives an operating signal of selecting the navigation function from the operating switches 4 or the remote control terminal 6, the control device 1 displays the navigation screen on the display device 8. When the control device 1 receives an operating signal of selecting the audio function from the operating switches 4 or the remote control terminal 6, the control device 1 displays the audio screen on the display device 8.

Furthermore, the control device 1 executes a display housing process and a display ejecting process based on signals from the operating switches 4 or the remote control sensor 5. In the display housing process, when the control device 1 receives the operating signal for putting the part of the display panel 8a in the housing case from the operating switches 4 or the remote control terminal 6, the control device 1 transmits a control signal to the display-device driving device 9 so that the display-device driving device 9 drives the display device 8 and the part of the display panel 8a is housed in the housing case. In the display ejecting process, when the control device 1 receives the operating signal for ejecting the display panel 8a from the housing case from the operating switches 4 or the remote control terminal 6, the control device 1 transmits a control signal to the display-device driving device 9 so that the display-device driving device 9 drives the display device 8 and the display panel 8a is ejected from the housing case.

Figure 2A:
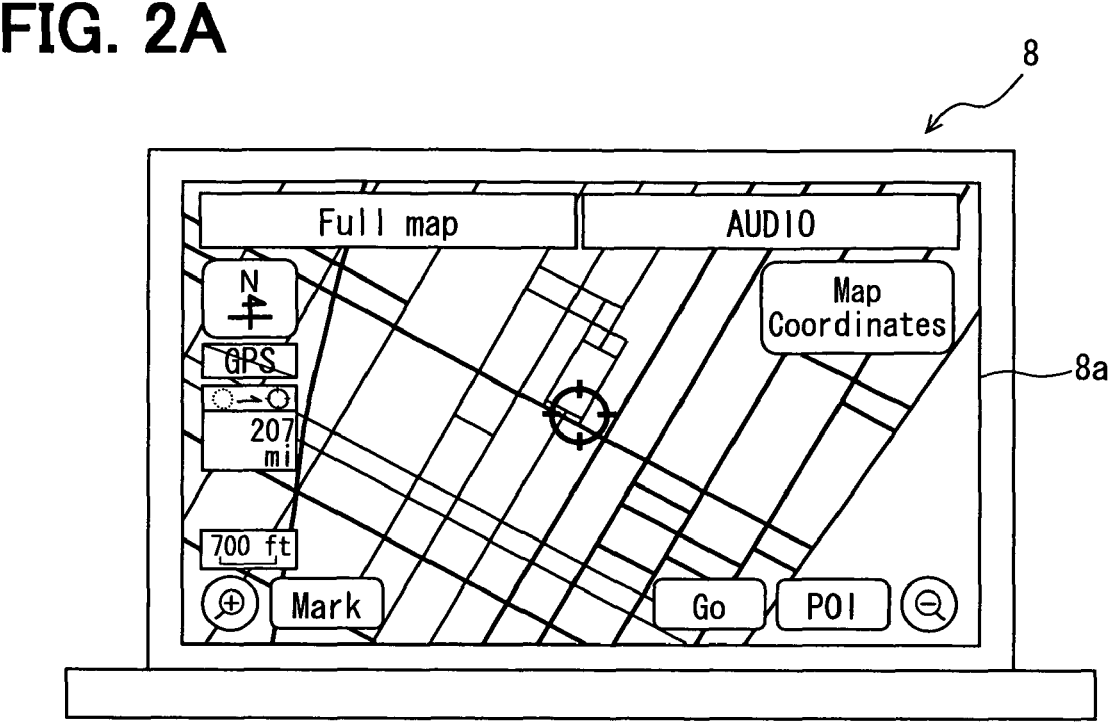
FIG. 2A is a diagram showing an exemplary state where a navigation screen is displayed on a display panel of a display device in a full-screen mode.

When the part of the display panel 8a is housed in housing case, that is, when the display panel 8a is ejected from the housing case, the control device 1 displays the navigation screen or the audio screen in full-screen of the display panel 8a, that is, the control device 1 displays the navigation screen in a full-screen mode, as illustrated in FIG. 2A. For example, a screen size in the full-screen mode is same as the whole area of the display panel 8a. In an example illustrated in FIG. 2A, the navigation screen is displayed on the display panel 8a in the full-screen mode.

Figure 2B:
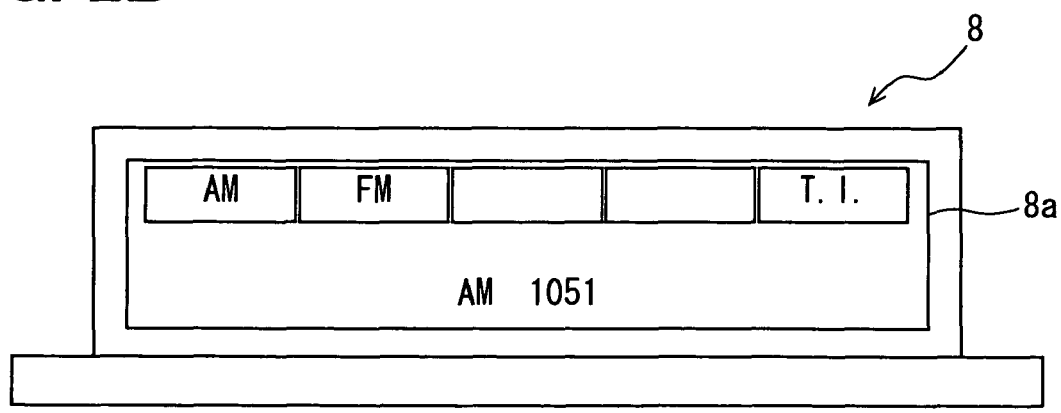
FIG. 2B is a diagram showing an exemplary state where an audio screen is displayed on the display panel of the display device in a compact-screen mode.

When the control device 1 controls the display-device driving device 9 so that the part of the display panel 8a is housed in the housing case in a state where the navigation screen is displayed on the display panel 8a, the control device 1 maintains the kill screen display of the navigation screen. When the control device 1 controls the display-device driving device 9 so that the part of the display panel 8a is housed in the housing case in a state where the audio screen is displayed on the display panel 8a, the control device 1 displays the navigation screen in a compact screen provided within a part of the display panel 8a not housed in the housing case, that is, the control device 1 displays the navigation screen in a compact-screen mode, while simplifying information to be displayed, as illustrated in FIG. 2B. For example, a screen size in the compact-screen mode is same as the whole area of a part of the display panel 8a not housed in the housing case. In an example illustrated in FIG. 2B, the audio screen is displayed on the display panel 8a in the compact-screen mode.

The control device 1 executes the volume adjusting process for adjusting volume of the audio voice signal from the audio device 12 and the sound quality adjusting process for adjusting sound quality of the audio voice signal from the audio device 12 based on signals from the operating switches 4 or the remote control sensor 5. For example, in the volume adjusting process, when the control device 1 receives an operating signal for setting the volume of the audio voice output from the audio output device 10 from the operating switches 4 or the remote control terminal 6, the control device 1 sets so that the audio voice is output from the audio output device 10 at a volume based on the operating signal. The setting of the volume includes setting the volume on mute at which the volume is zero. Therefore, the operating switches 4 and the remote control terminal 6 can also operate as a second operation input portion.

Furthermore, the control device 1 executes a route guidance continuing process when the display panel 8a is housed in a state where the route guidance is performed with the navigation screen so that the route guidance is continued with the voice guidance.

Figure 3:
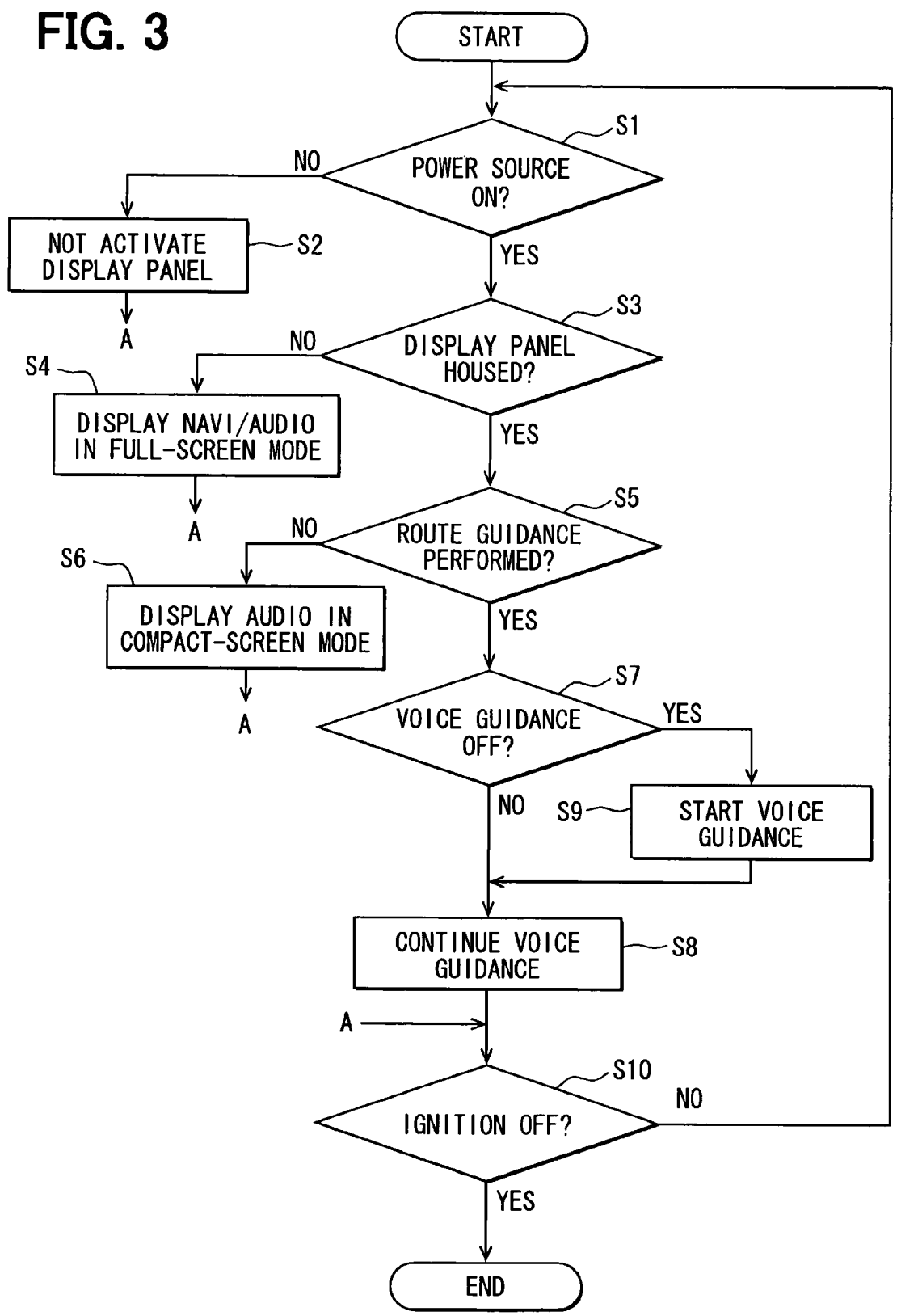
FIG. 3 is a flowchart showing an example of a route-guidance continuing process performed by a control device.

An example of the route-guidance continuing process executed by the control device 1 will be described with reference to FIG. 3. The control device 1 starts the route-guidance continuing process when the key position detector 7 detects that the key position of the ignition key is at "IG-ON," that is, when an ignition switch of the vehicle is turned on.

At S1, the control device 1 determines whether the power source of the navigation system is on. If the control device 1 determines that the power source of the navigation system 100 is on, which corresponds to "YES" at S1, the process proceeds to S3. If the control device 1 determines that the power source of the navigation system is off, which corresponds to "NO" at S1, the process proceeds to S2. At S2, the control device 1 does not activate the display panel 8a of the display device 8 and the process proceeds to S10.

At S3, the control device 1 determines whether the display housing process is performed and the part of the display panel 8a is housed in the housing case. The control device 1 determines that the part of the display panel 8a is housed in the housing case, for example, when the display housing process is performed and the display ejecting process is not performed. If the control device 1 determines that the part of the display panel 8a is housed in the housing case, which corresponds to "YES" at S3, the process proceeds to S5. If the control device 1 determines that the part of the display panel 8a is not housed in the housing case, which corresponds to "NO" at S3, the process proceeds to S4.

At S4, the control device 1 transmits a control signal to the display device 8 so that the display device 8 displays one of the navigation screen and the audio screen which is selected in the navi/audio switching process in the full-screen mode. Then, the process proceeds to S10.

At S5, the navigation screen determining portion 1a in the control device 1 determines whether the route guidance with the navigation screen is being performed. If the navigation screen determining portion 1a in the control device 1 determines that the route guidance with the navigation screen is being performed, which corresponds to "YES" at S5, the process proceeds to S7. If the navigation screen determining portion 1a in the control device 1 determines that the route guidance with the navigation screen is not being performed, which corresponds to "NO" at S5, the process proceeds to S6. At S6, the control device 1 transmits a control signal to the display device 8 so that the display device 8 displays the audio screen in the compact-screen mode. Then, the process proceeds to S10.

At S7, the voice guidance control portion 1b in the control device 1 determines whether the voice guidance off setting is selected in the voice guidance setting process. If the voice guidance control portion 1*b* determines that the voice guidance off setting is selected, which corresponds to "YES" at S7, the process proceeds to S9. If the voice guidance control portion 1*b* determines that the voice guidance off setting is not selected, which corresponds to "NO" at S7, the process proceeds to S8.

At S8, the voice guidance is continued and the process proceeds to S10. At S9, the voice guidance control portion 1*b* transmits a control signal to the audio output device 10 so that the audio output device 10 starts the voice guidance.

At S10, the control device 1 determines whether the ignition switch of the vehicle is off. For example, when the key position detector 7 detects that the key position of the ignition key is at "IG-OFF," the control device 1 determines that the ignition switch is off. If the control device 1 determines that the ignition switch of the vehicle is off, which corresponds to "YES" at S10, the process ends. If the control device 1 determines that the ignition switch of the vehicle is not off, which corresponds to "NO" at S10, the process returns to S1.

In the above-described process, even when at least the part of the display panel 8*a* is housed during the route guidance with the navigation screen, and the route guidance with the navigation screen is not sufficient, the route guidance is performed with the voice guidance. Thus, the route guidance can be stably performed even when the part of the display panel 8*a* of the display device 8 is housed in the housing case. Even when the part of the display panel 8*a* is housed in the housing case, when the voice guidance control portion 1*b* of the control device 1 determines that the voice guidance from the audio output device 10 is not performed, that is, the voice guidance off setting is selected, the voice guidance control portion 1*b* forcibly starts the route guidance with the voice guidance. Thus, even when the part of the display panel 8*a* is housed in the housing case in a state where the voice guidance off setting is selected, the route guidance can be stably performed.

An example of a route guidance continuing process executed by a control device 1 of a navigation system 100 according to another embodiment of the present invention will be described with reference to FIG. 4. The control device 1 starts the route guidance continuing process when the key position detector 7 detects that the key position of the ignition key is at "IG-ON," that is, when the ignition switch of the vehicle is turned on. In the route guidance continuing process illustrated in FIG. 4, when the route guidance is performed with the navigation screen, the route guidance with the voice guidance is simultaneously performed.

A process from S11 to S16 may be similar to that from S1 to S6 described above. At S17, the control device 1 determines that a volume level set in the volume adjusting process is less than a predetermined level. The predetermined level can be set optionally. For example, the predetermined level is set to be a volume level at which a general user is difficult to catch the voice while driving. When the control device 1 determines that the volume level set in the volume adjusting process is less than the predetermined level, which corresponds to "YES" at S7, the process proceeds to S19. When the control device 1 does not determine that the volume level set in the volume adjusting process is less than the predetermined level, which corresponds to "NO" at S17, the process proceeds to S18. A process at S18 may be similar to that at S8.

At S19, the control device 1 forcibly raise the volume of the voice output from the audio output device 10 to be a volume level greater than the predetermined level and executes the route guidance with the voice guidance. The volume level greater than the predetermined level can be set optionally. For example, the volume level is set to be a level at which a general user can easily catch the voice while driving. A process at S20 may be similar to that at S10.

In the navigation system according to the present embodiment, even when the part of the display panel 8*a* is housed in the housing case during the route guidance, and the route guidance with the navigation screen becomes not sufficient, the route guidance can be performed with the voice guidance. Thus, even when the part of the display panel 8*a* is housed in the housing case; the route guidance can be provided stably. When the part of the display panel 8*a* is housed in the housing case and the volume level of the voice guidance is set to be mute or a level at which a user is difficult to catch while driving, the control device 1 forcibly raises the volume level of the voice guidance to a level at which a user can easily catch while driving. Thus, even when the part of the display panel 8*a* is housed in the housing case in a state where the volume level of the audio output is set to be mute or a level at which a user is difficult to catch, the route guidance can be stably provided.

Figure 4:
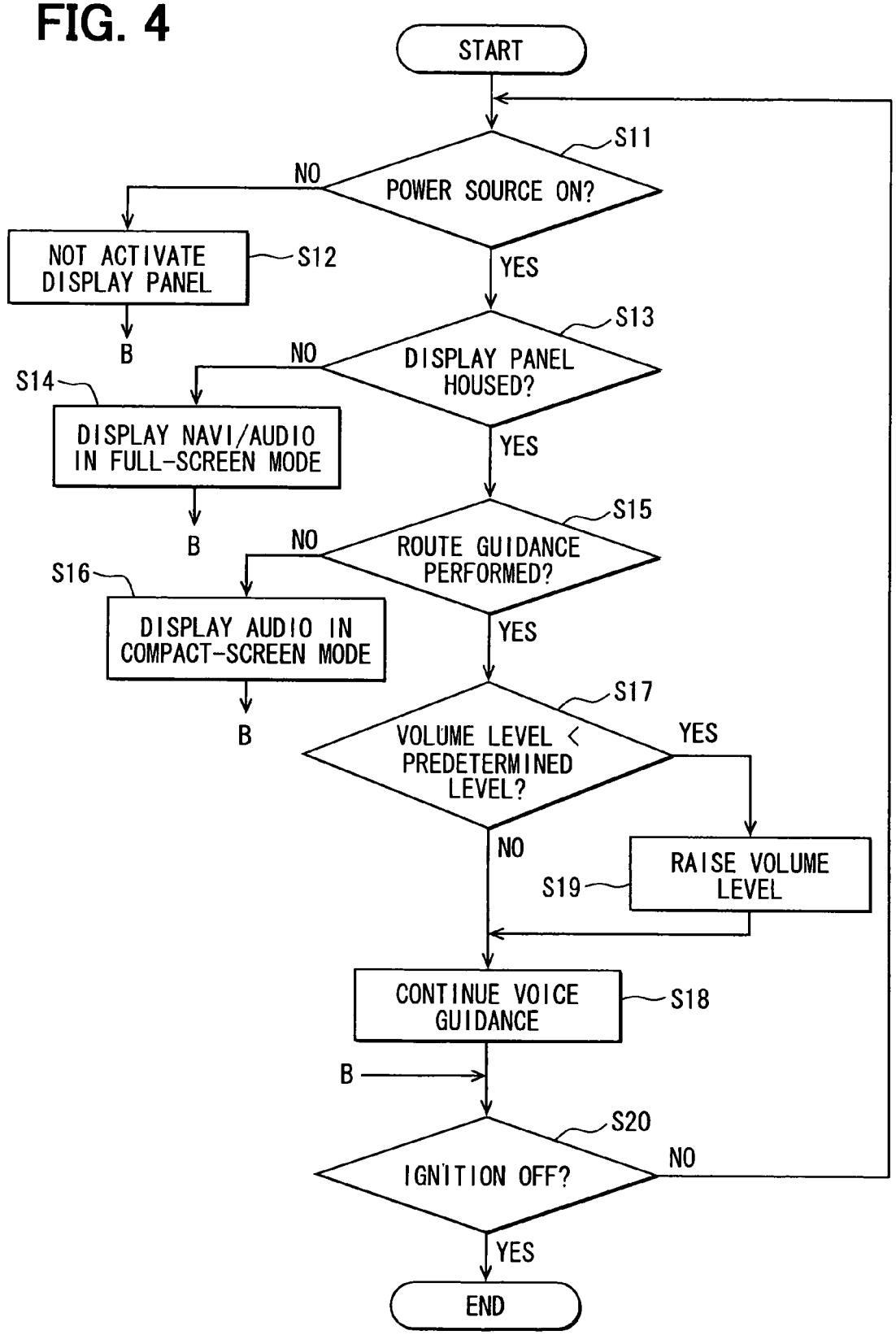
FIG. 4 is a flowchart showing another example of a route-guidance continuing process.

In the process illustrated in FIG. 4, when the route guidance is performed with the navigation screen, the route guidance with the voice guidance is simultaneously performed, as an example. For example, when the voice guidance off setting is available, the control device 1 device may determine whether the route guidance off setting is performed before executing the process at S17. When the control device 1 determines that the voice guidance off setting is performed, the control device 1 forcibly starts the voice guidance and the process proceeds to S17. When the control device 1 does not determine that the voice guidance off setting is performed, the process proceeds to S17.

In the above-described embodiments, when the part of the display panel 8*a* of the display device 8 is housed in the housing case while performing the route guidance with the navigation screen, the control device 1 maintains the full-screen mode, as an example. The control device 1 may also change the navigation screen into the compact-screen mode where the display device 8 displays the navigation screen in the compact screen provided within a portion not housed in the housing case while simplifying information to be displayed. The control device 1 may also stop displaying the navigation screen.

In the above-described embodiments, the audio device 12 includes the deck for playing music data stored in the music storage medium and the radio tuner for receiving the radio broadcast. The audio device 12 may also include deck for playing image data and audio data stored in an image storage medium and a TV tuner for receiving a TV broadcast.

In the above-described embodiments, the navigation system 100 includes the audio device 12. Alternatively, the navigation system 100 may not include the audio device 12.

In the above-described embodiments, the part of the display panel 8*a* of the display device 8 is housed in the housing case. The whole display panel 8*a* of the display device may also be housed in the housing case. Also in the present case, when the whole display panel 8*a* of the display device 8 is housed in the housing case, the route guidance can be performed with the voice guidance. Thus, the route guidance can be stably provided.

Although the present invention has been fully described in connection with the exemplary embodiments thereof with reference to the accompanying drawings, it is to be noted that various changes and modifications will become apparent to those skilled in the art. For example, a technical feature described in one of the above-described embodiments can be combined with a technical feature described in another one of the above-described embodiments.

What is claimed is:

1. A vehicle navigation system including a display device having a display panel, the display device configured to be movable so that a part of the display panel is capable of being housed, the vehicle navigation system configured to search a route from a starting point to a destination and perform a route guidance of the route by displaying a navigation screen on the display panel, the vehicle navigation system comprising:
   a voice output device configured to perform the route guidance with a voice output;
   a navigation screen determining portion configured to determine whether the route guidance is being performed by displaying the navigation screen on the display panel when the part of the display panel is housed;
   a voice guidance control portion configured to control the voice output device so that the voice output device performs the route guidance with the voice output when the navigation screen determining portion determines that the route guidance is being performed by displaying the navigation screen on the display panel; and
   a first operation input portion configured to receive an operation input of whether performing the route guidance with the voice output, wherein:
      when the first operation input portion receive an operation input for performing the route guidance with the voice output, the voice output device performs the route guidance with the voice output, and when the first operation input portion receives an operation input for not performing the route guidance with the voice output, the voice output device stops the route guidance with the voice output; and
      when the navigation screen determining portion determines that the route guidance is being performed by displaying the navigation screen on the display panel, the voice guidance control portion determines whether the route guidance with the voice output is being performed, and when the voice guidance control portion determines that the route guidance with the voice output is not being performed, the voice guidance control portion controls the voice output device so that the voice output device starts the route guidance with the voice output.

2. The vehicle navigation system according to claim 1, wherein
   the display device is configured so that the part of the display panel is capable of being housed in a recess portion provided in an interior panel of a vehicle.

3. The vehicle navigation system according to claim 1, wherein
   the display device is configured so that the part of the display panel is capable of being housed inside an interior panel of a vehicle.

4. The vehicle navigation system according to claim 3, wherein
   the display device is configured so that the part of the display panel is capable of being housed inside an instrument panel in the interior panel of the vehicle.

5. A vehicle navigation system including a display device having a display panel, the display device configured to be movable so that a part of the display panel is capable of being housed, the vehicle navigation system configured to search a route from a starting point to a destination and perform a route guidance of the route by displaying a navigation screen on the display panel, the vehicle navigation system comprising:
   a voice output device configured to perform the route guidance with a voice output;
   a navigation screen determining portion configured to determine whether the route guidance is being performed by displaying the navigation screen on the display panel when the part of the display panel is housed;
   a voice guidance control portion configured to control the voice output device so that the voice output device performs the route guidance with the voice output when the navigation screen determining portion determines that the route guidance is being performed by displaying the navigation screen on the display panel; and
   a second operation input portion configured to receive an operation input for setting a volume of the voice output from the voice output device, wherein:
      the voice output device is configured to output the voice output at the volume set through the second operation input portion; and
      when the navigation screen determining portion determines that the route guidance is being performed by displaying the navigation screen on the display panel, the voice guidance control portion determines whether the volume of the voice output from the voice output device is less than a predetermined level, and when the voice guidance control portion determines that the volume of the voice output is less than the predetermined level, the voice guidance control portion controls the voice output device so that the voice output device performs the route guidance with the voice output at a volume greater than or equal to the predetermined level.

6. The vehicle navigation system according to claim 5, wherein the display device is configured so that the part of the display panel is capable of being housed in a recess portion provided in an interior panel of a vehicle.

7. The vehicle navigation system according to claim 5, wherein
   the display device is configured so that the part of the display panel is capable of being housed inside an interior panel of a vehicle.

8. The vehicle navigation system according to claim 7, wherein
   the display device is configured so that the part of the display panel is capable of being housed inside an instrument panel in the interior panel of the vehicle.

* * * * *